US007424445B1

United States Patent
Cue et al.

(10) Patent No.: US 7,424,445 B1
(45) Date of Patent: Sep. 9, 2008

(54) VIRTUAL BUNDLES

(75) Inventors: Eduardo Cue, Mountain view, CA (US);
Shaun Hilton, Saratoga, CA (US);
Glenn D. Epis, Sunnyvale, CA (US);
Judy D. Halchin, Cupertino, CA (US);
Susan Pfendt, Santa Clara, CA (US);
Cathy Ridenour, Campbell, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 09/544,718

(22) Filed: Apr. 6, 2000

(51) Int. Cl.
*G06Q 30/00* (2006.01)

(52) U.S. Cl. .................................................. 705/26

(58) Field of Classification Search .............. 705/26–27
See application file for complete search history.

(56) References Cited

U.S. PATENT DOCUMENTS 5,970,475 A * 10/1999 Barnes et al. .................. 705/27
6,167,383 A * 12/2000 Henson ........................ 705/26

FOREIGN PATENT DOCUMENTS

| DE | 199 40 209 A1 | 3/2000 |
|----|---------------|--------|
| JP | 10-124526 | 5/1998 |
| JP | 11-213038 | 8/1999 |
| JP | 2000-099577 | 4/2000 |

OTHER PUBLICATIONS

Dell Computer, Internet Archive Wayback Machine, 30 pages total: Jan. 30, 1998, pp. 2-24; Dec. 02, 1998, pp. 25-28; Feb. 22, 1999, pp. 29-30; http://web.archive.org/web/*/http://www.dell.com.*
M2 Presswire, "Dell Computer Corporation: Dell Launch Latest Version Of Their Premier Page Service Via Internet," Dec. 18, 1998, Dialog file 20 190 03813212.*
Business Wire, "Dell ImageWatch Service Enhances Tehnology Management For Corporate Customers; Service Provides Key Information On Hardware, Software And Peripheral Changes," Jan. 21, 1999, Dialog file 20 #04084219.*
Business Wire, "New Paperless Purchase Order Moves Dell Customer Premier Pages Service A Step Closer To Virtual Integration," Jun. 16, 1998, Dialog file 20 #01939695.*
Dell Computer: Jackson, Tony, "The Entrepreneur Who Pioneered The Sale Of PCs On The Internet Tells Tony Jackson How It Is Possible To Get The Customer To Do Much Of The Work," Financial Times, Nov. 5, 1998, ProQuest #35670718.*
PRN: "GE Capital Fleet Services Launches Driver-Based Vehicle Ordering Application," PR Newswire, Dec. 15, 19999, 2pgs, Proquest 47240650.*

(Continued)

*Primary Examiner*—James Zurita
(74) *Attorney, Agent, or Firm*—Buchanan Ingersoll & Rooney PC (57) ABSTRACT

Virtual bundles of purchasable products are created by a person external to an electronic commerce site. In a preferred embodiment, the virtual bundles are associated with custom store accessible only by members of a group associated with the external administrator.

21 Claims, 11 Drawing Sheets

OTHER PUBLICATIONS

Dell.com: Internet Archives Wayback Machine (www.archive.org); www.dell.com; 12 pgs.*

Joseph E Maglitta, Special Dell-ivery, Electronic Business. Highlands Ranch: Dec. 1997.vol. 23, Iss. 12; p. 43, retrieved from ProQuest Direct on the Internet on Nov. 10, 2006, 8 pages.*

09_544718_n_545034_ScreenImages_StoreAppleCom_01. doc, 3 pages.*

09_544718_n_545034_ScreenImages_AppleStoreEducation_02.doc, 4 pages.*

09_544718_n_545034_ScreenImages_StoreAppleCom_03. doc, 1 page.*

* cited by examiner

| Description Edit✎ Delete 🗑 | Description Edit✎ Delete 🗑 | Description Edit✎ Delete 🗑 |
|---|---|---|
| Mike's System | Display | Powerbook |
| Product Info URL: | Product Info URL: | Product Info URL: |
| http:\\www.apple.com | | |
| Display Order [7] | Display Order [10] | Display Order [11] |
| Configurable: | Configurable: | Configurable: |
| Price: $3,042.00 | Price: $1,836.00 | Price: $1,731.00 |
| Macintosh Server G4<br>∗Accessory kit<br>∗RAGE 128 Pro card-16MB SDRAM<br>∗10/100BASE-T Ethernet built-in<br>∗DVD-ROM drive with DVD-Video<br>∗18GB Utra2 SCSI, 2-channel card<br>∗400MHz PowerPC G4-1MB L2 cache<br>∗Ultra SCSI PCI card & cable adapter<br>∗256MB SDRAM-1 DIMM<br>∗USB Keyboard | iBook 366MHz Special Edition<br>∗Graphite<br>∗CD-ROM drive<br>∗128MB SDRAM-1 SO DIMM<br>∗6GB IDE drive | iBook 300MHz<br>∗AirPort Card<br>∗Tangerine<br>∗CD-ROM drive<br>∗6GB IDE drive<br>∗128MB SDRAM-1 SO DIMM |

View Current Order        Worldwide        Help

AppleStore

Recommendations of Denver Public Schools

Zip drive bundle
Power Mac G4 450MHz
$2,166.00
( Select )

Science Lab G4
Power Mac G4
*RAGE 128 Pro card–16MB SDRAM
*10/100BASE-T Ethernet built-in
*56K internal modem with FAXstf
*DVD-ROM drive with DVD-Video
*10GB Ultra ATA drive
*Accessory kit
*256MB SDRAM-1 DIMM
*400MHz PowerPC G4-1MB L2 cache
$1,792.00
( Select )

OS X Server
Macintosh Server G4 with Mac OS X Server
*512MB SDRAM-2 DIMMs
*Accessory kit
*DVD-ROM drive
*36GB Ultra2 SCSI, 2-channel card
*USB Keyboard
*Four-port 10/100 Ethernet PCI card
*RAGE 128 Pro card–16MB SDRAM
*500MHz PowerPC G4-1MB L2 cache
*Ultra SCSI PCI card & cable adapter
$5,168.00
( Select )

Type-matched G4
Iomega USB Zip Disk 6-pack
$188.00
( Select )

iMac SE
PowerBook
*500MHz PowerPC G3 with 1MB L2 cache
*18GB Ultra ATA drive
*128MB SDRAM – 1 SO DIMM
Extra AC Power Adapter
Extra Lithium-ion Rechargeable Battery
$3,469.00
( Select )

G4 Server
iBook 366MHz Special Edition
*128MB SDRAM-1 SO DIMM
*CD-ROM drive
*6GB IDE drive
*Graphite
$1,836.00
( Select )

Mike's System
Macintosh Server G4
*Accessory kit
*RAGE 128 Pro card–16MB SDRAM
*10/100BASE-T Ethernet built-in
*DVD-ROM drive with DVD-Video
*18GB Utra2 SCSI, 2-channel card
*400MHz PowerPC G4-1MB L2 cache
*Ultra SCSI PCI card & cable adapter
*256MB SDRAM-1 DIMM
*USB Keyboard
More Product Info
$3,042.00
( Select )

Display
iBook 366MHz Special Edition
*Graphite
*CD-ROM drive
*128MB SDRAM-1 SO DIMM
*6GB IDE drive
$1,836.00
( Select )

Powerbook
iBook 300MHz
*AirPort Card
*Tangerine
*CD-ROM drive
*6GB IDE drive
*128MB SDRAM-1 SO DIMM
$1,731.00
( Select )

VIRTUAL BUNDLES

BACKGROUND OF THE INVENTION

1. Field of the Invention

The present invention relates to electronic commerce sites.

2. State of the Art

In recent years, the Internet has exploded in popularity. In particular, electronic commerce sites using the Internet have become a popular way for consumers to obtain products from vendors. Typically, the consumer uses a web browser at their computer to connect to a web site of a vendor across the Internet.

Electronic commerce sites usually are produced using servers. The servers include a web server, which produces the web pages, and an application server, which runs applications for the operation of the electronic commerce site. The web server can communicate with the application server using a protocol such as the Common Gateway Interface (CGI).

In some sites, it makes sense to bundle together a number of products and make the bundle available for purchase by a consumer. For example, computer vendor sites typically offer bundled computer systems. Unfortunately, the bundles selected by the vendor are not always the best solution for every consumer group. Different groups have different needs that can not always be anticipated by the vendor.

It is desired to have an improved system of providing bundles of products for purchase by a consumer at a web site.

SUMMARY OF THE PRESENT INVENTION

The present invention relates to an electronic commerce system in which an external administrator can bundle together a number of products offered by a vendor via electronic commerce to produce a virtual bundle. The virtual bundle of products can then be offered for sale at an electronic commerce site by a vendor. Since the virtual bundle of products is selected by an external administrator, the virtual bundle of products will be better suited to the customers' needs.

One embodiment of the present invention is a system including a server system adapted to allow the production of virtual bundle of products to be sold in an electronic commerce site of a vendor. The products to be bundled are selected from a number of selectable products. The virtual bundle is suitable for purchase by a member of a group other than the vendor. The system also includes an external group administrator computer. The external computer is operably connectable to the server system, wherein the external computer is adapted to provide bundle selection data from the person to the server system. The server system is adapted to use the bundle selection data to produce the virtual bundle.

Another embodiment of the present invention comprises a computer-readable medium containing a program that executes a procedure. The procedure includes storing the virtual bundle data in a database as a result of virtual bundle data sent from an external computer. The procedure also includes providing a virtual bundle of products to be sold at the electronic commerce site of a vendor. The products to be bundled being selected from a number of selectable products. The virtual bundle is suitable for purchase by a member of the group other than the vendor. The providing step uses the virtual bundle data stored in the database.

Yet another embodiment of the present invention comprises an apparatus including means for receiving virtual bundle data sent from an external computer and for storing the virtual bundle in a database. The apparatus also includes means for providing a virtual bundle of products to be sold at an electronic commerce site of a vendor. The products to be bundled are selected from a number of selectable products. The virtual bundle is suitable for purchase by a member of the group other than the vendor. The providing means uses the virtual bundle data stored in the database to produce a virtual bundle of products.

DETAILED DESCRIPTION OF THE PREFERRED EMBODIMENT

Figure 1A:
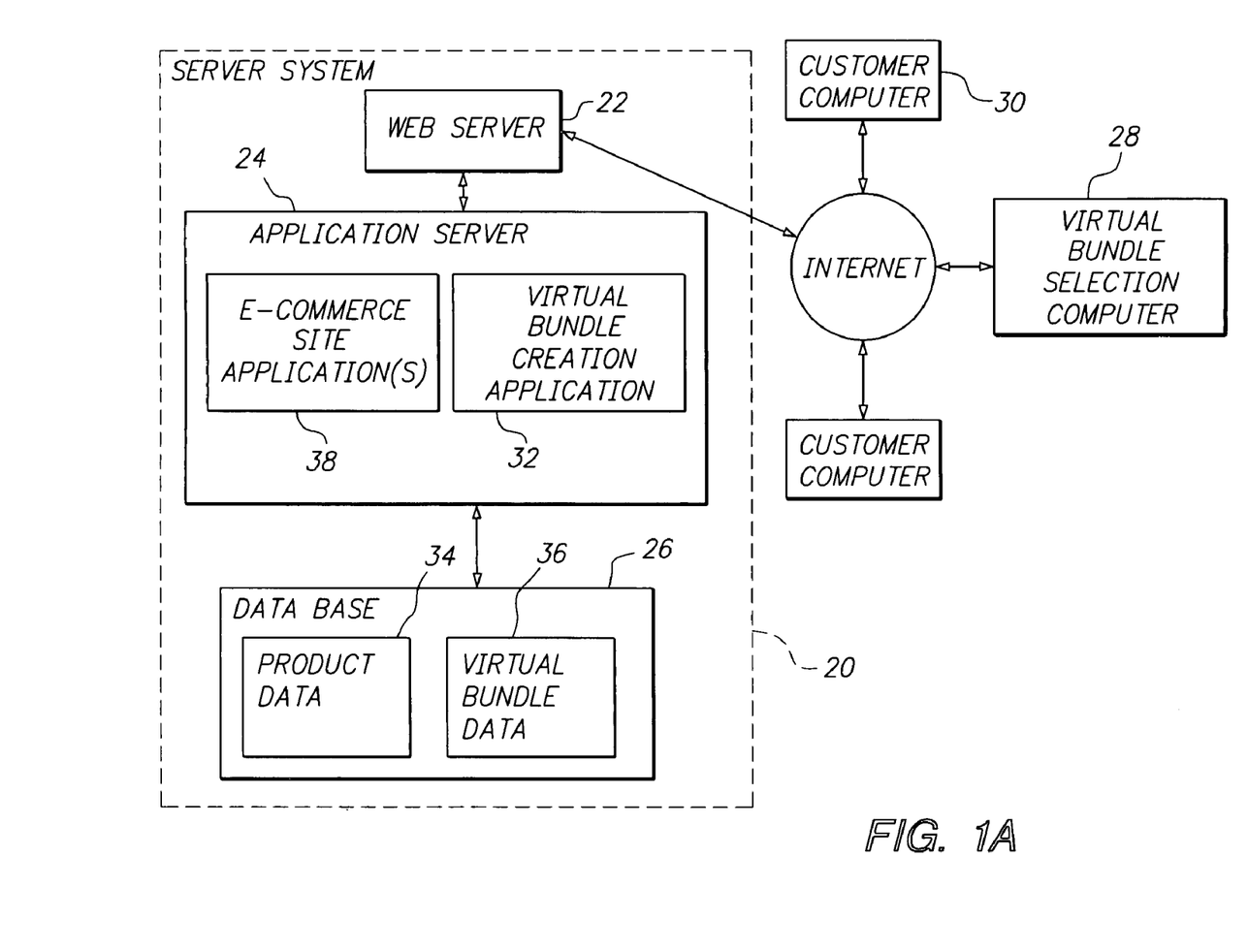
FIGS. 1A and 1B are diagrams that illustrate an overview of a server system which can be used in one embodiment of the present invention.

FIG. 1A is a diagram that illustrates one embodiment of the present invention. The server system 20 includes a web server 22, an application server 24, and a database 26. Web server 22 is preferably isolated from application server 24 using a firewall. Customer computers, such as customer computer 30, use a browser to access an electronic commerce site produced by the server system 20. The browser sends a URL (Uniform Resource Locator) to the web server which uses the application server 24 to create a web site which is provided to the customer computer 30. An interface protocol, such as the Common Gateway Interface is used in the interaction of the web server 22 and the application server 24. Application server 24 uses an electronic commerce application to create the web pages. The electronic commerce site is created using data from a database, such as database 26.

In the present invention, an external computer, such as the virtual bundle selection computer 28, is used to access the server system 20. Once the server system 20 has obtained authorization information from the user of the external computer 28, the virtual bundle creation application allows for the creation of the virtual bundles by the user of the external computer 28.

The virtual bundle creation application 32 provides to the administrator a list of product data 34 available for bundling. The administrator at the external computer 28 selects certain products from the list to be bundled together as a virtual bundle. The virtual bundle data 36 is stored in the database and is available for the electronic commerce type applications 38 to provide the virtual bundle to the customer.

In a preferred embodiment, the creator of the virtual bundle is associated with a group other than the electronic commerce site vendor. The customer 30 is preferably a member of this group and the product bundle is offered to the member of the group when the member goes to the electronic commerce site.

Figure 1B:
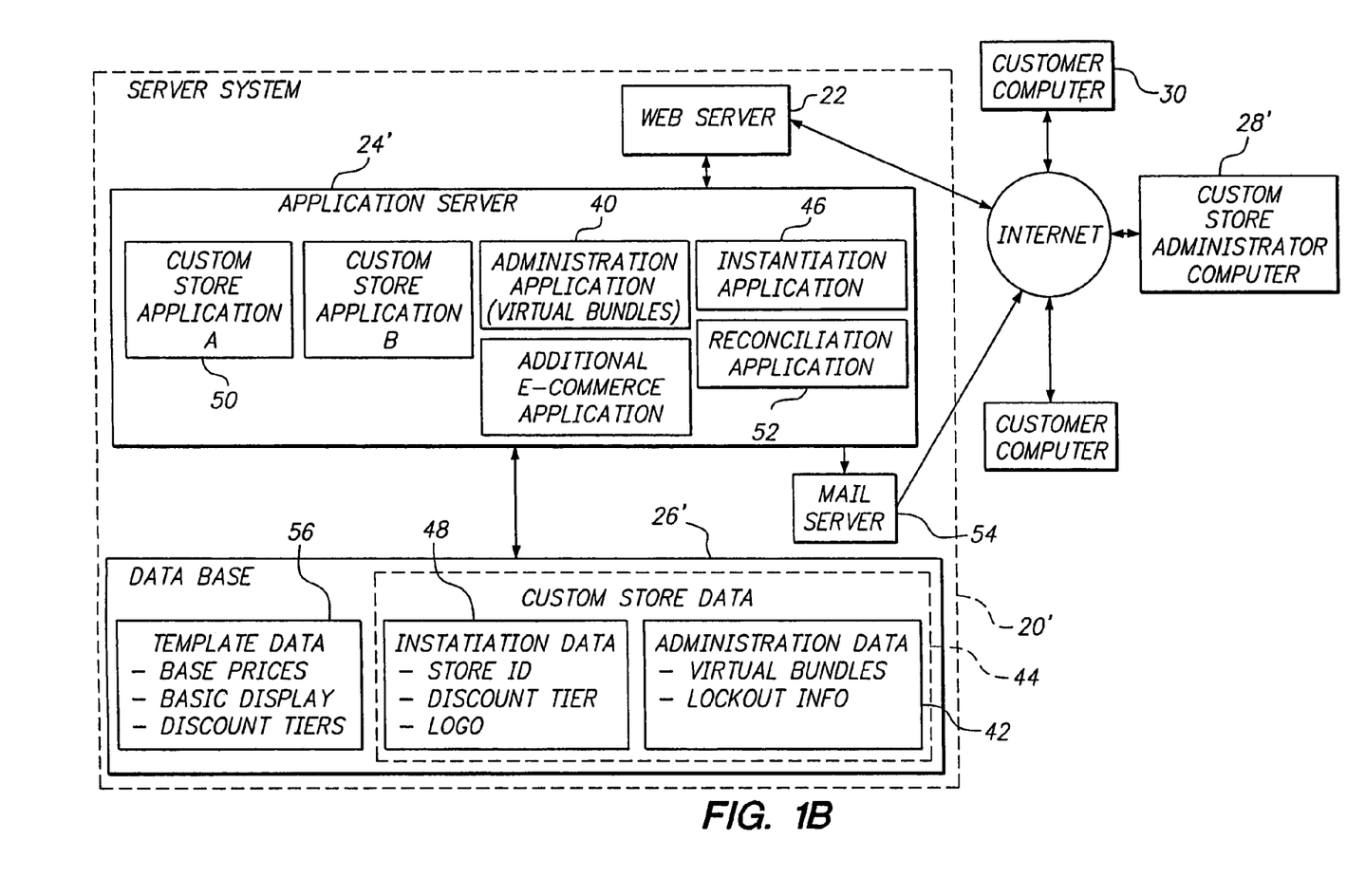

One way of implementing the virtual bundles uses custom electronic commerce sites as shown with respect to FIG. 1B.

FIG. 1B shows a server system in which custom electronic commerce stores are created. Additional details of the custom store application are given within the patent application "Custom Stores," Ser. No. 09/545,034, filed on the same day as the present application and incorporated herein by reference.

In this embodiment, the virtual bundle creation application is part of an administration application 40 which can be accessed by the custom store administrative computer 28'. The virtual bundle data is part of the administration data 42 in the custom store data 44 of the database 26'. In the custom store embodiment, the custom store administrator computer 28' is used to input configuration data for creating a custom store web site. This custom store data is stored in the database 26'. When a customer comes to the custom store web site, a custom store web site is created using the configuration data in the database 26'. A portion of this configuration data is the virtual bundle data which allows a group member going to the custom store to select a virtual bundle of products.

In one embodiment, an instantiation application 46 in the application server 24' is used to set up the instantiation data for the custom store. This instantiation data can include the store I.D., discount tier, and logo. This data is stored in an instantiation data block 48 in the custom store data 44 of the database 26'. Custom store application 50 is used to create the custom store web site using the data stored in the database 26'.

Reconciliation application 52 is used to check the virtual bundles to determine whether any products in the virtual bundles have become obsolete or could be upgraded. Once the reconciliation application 52 finds such products in a bundle, an e-mail is sent, using mail server 54, to the custom store administrator computer 28' so that the custom store administrator can modify the virtual bundle. In the preferred embodiment, the database 26' includes template data 56 including a base price list and basic display information that is used by each custom stores and by the main web site store.

Figure 2:
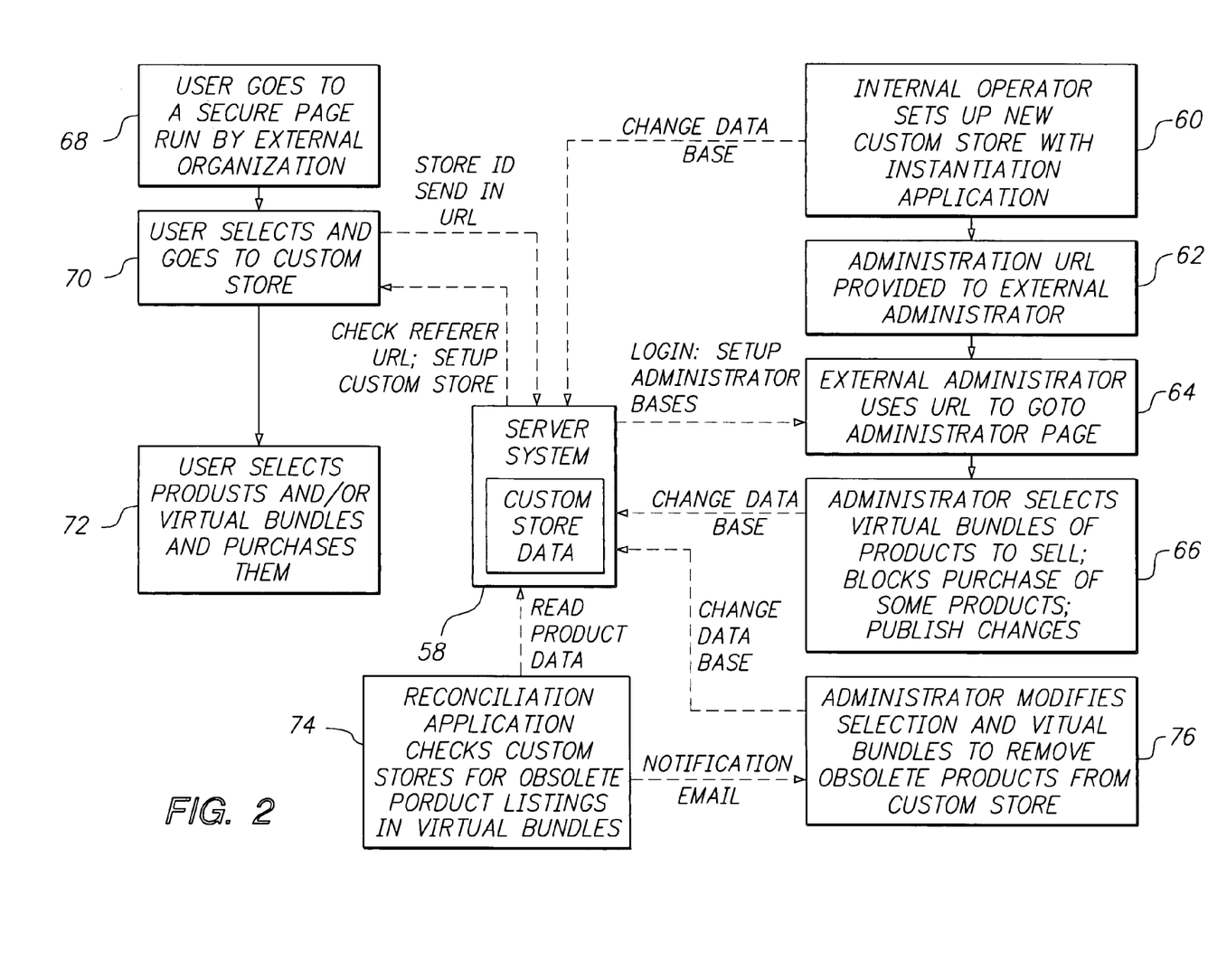
FIG. 2 is a diagram that illustrates the construction of virtual bundles in one embodiment of present invention.

FIG. 2 shows the operation of one embodiment of the present invention. In step 60, an internal operator sets up a new custom store using an instantiation application. This results in a change in the database of the server system 58. In step 62, an administration web page URL is provided to an external administrator (e.g., 20', FIG. 1B). This URL accesses a web page used for the selection of a virtual bundle to be provided to the administrator. The URL can be loaded into a Favorites page of the browser in the external computer. In step 64, the external administrator uses the URL to go to the administrator page. In step 66, the external administrator selects the virtual bundles of the products. Additionally, certain other products can be blocked from purchase. When the administrator is finished, the changes are published which causes the virtual bundle in the database of the server system 58 to be modified.

The customer goes to a custom page to order the virtual bundle of products. In step 68, the user goes to a secure page run by an external organization or group. In step 70, the users selects and goes to a custom web store. As discussed below with respect to FIG. 8, by having a secure page run by the external organization, the server system 58 need not store a password for each member of the group. Using the secure page requires that the external organization, rather than the vendor, to maintain the member I.D.s and passwords. The server system 58 checks the "referer" field of the Hyper Text Transfer Protocol (HTTP) header. If the referer header field includes the URL of the secure page, then the custom web store is created and displayed to the user. Alternatively some portion of the URL, such as the host name, could be checked.

The display indicates the virtual bundles which are selected by the administrator. In step 72, the user selects a virtual bundle of products to order. In step 74, the reconciliation application checks the custom stores for obsolete product listings in the virtual bundle. If there is an obsolete product listing, a notification e-mail is sent to the administrator. In step 76, the external administrator modifies the virtual bundles to remove the obsolete products from the custom stores.

Figure 3:
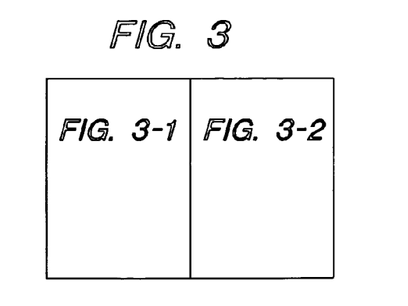
FIG. 3 is a diagram of an administration web site that allows the creation of a virtual bundle of products.

FIG. 3 illustrates an administration web page which allows for the selection of virtual bundles. As shown in FIG. 3, the system has a description box 110 for a system description of a virtual bundle. The system description given can describe the virtual bundle or give an indication of which subgroup the bundle is targeted to. A display order input box 112 gives the order in which the virtual bundle is displayed at the "recommended systems" page. A product information URL box 114 can be used to indicate an additional page that gives a further description of the virtual bundle. For example, a page maintained by the external administrator can describe the virtual bundle products.

A "configurable" box 116 determines whether the virtual bundle can be configured. If the virtual bundle can be configured, the customer is permitted to modify the system before purchase. If the bundle cannot be configured, the user cannot make modifications to the system before purchase.

When the reconciliation application determines that an obsolete product is used in a bundle, a "Needs Attention" indication (not shown) is displayed.

An editing button 120 is provided for the editing of virtual bundles, and a delete button 122 is provided for deleting of the virtual bundle. To build a new bundle, the administrator selects the "Add New System" button 124 which sends the administrator to a page giving a list of the different products which can be bundled into a virtual bundle. In one embodiment, the selection of the virtual bundle itself is quite similar to the selection of the computer in the normal electronic commerce site.

The "Publish" button 128 updates the database so that when a group member goes to the custom store, the new virtual bundles will be available.

Figure 4:
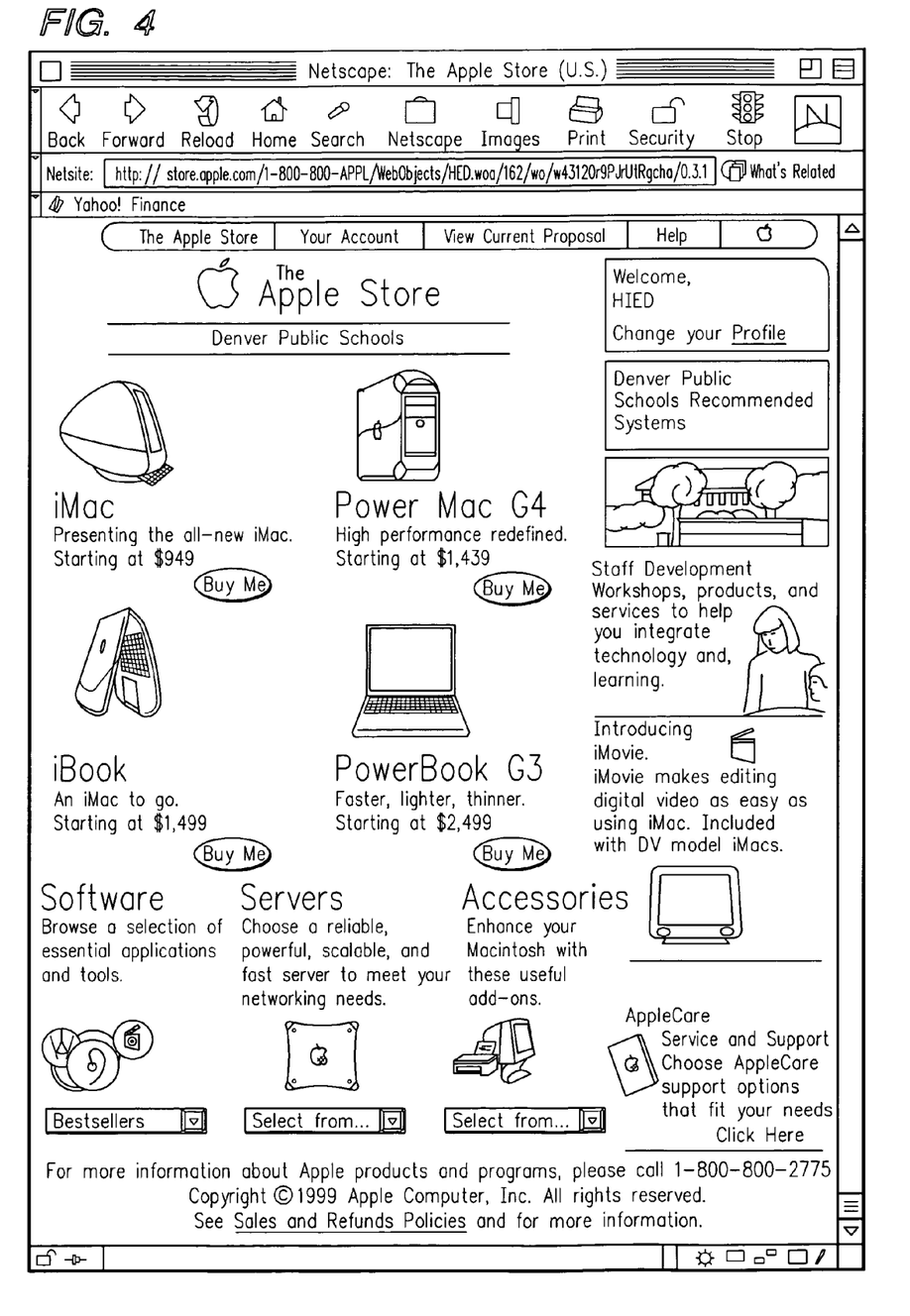
FIG. 4 and FIG. 5 are diagrams that illustrate a custom web store that offers the virtual bundles of products to members of a group.

FIG. 4 illustrates an example of a custom store page. This custom store page is based upon the main store pages. In a preferred embodiment, the "look and feel" of the custom store is quite similar to that of the main store. Since the custom store uses template data from the database, updates to the main store are automatically made to the custom store.

Figure 5:
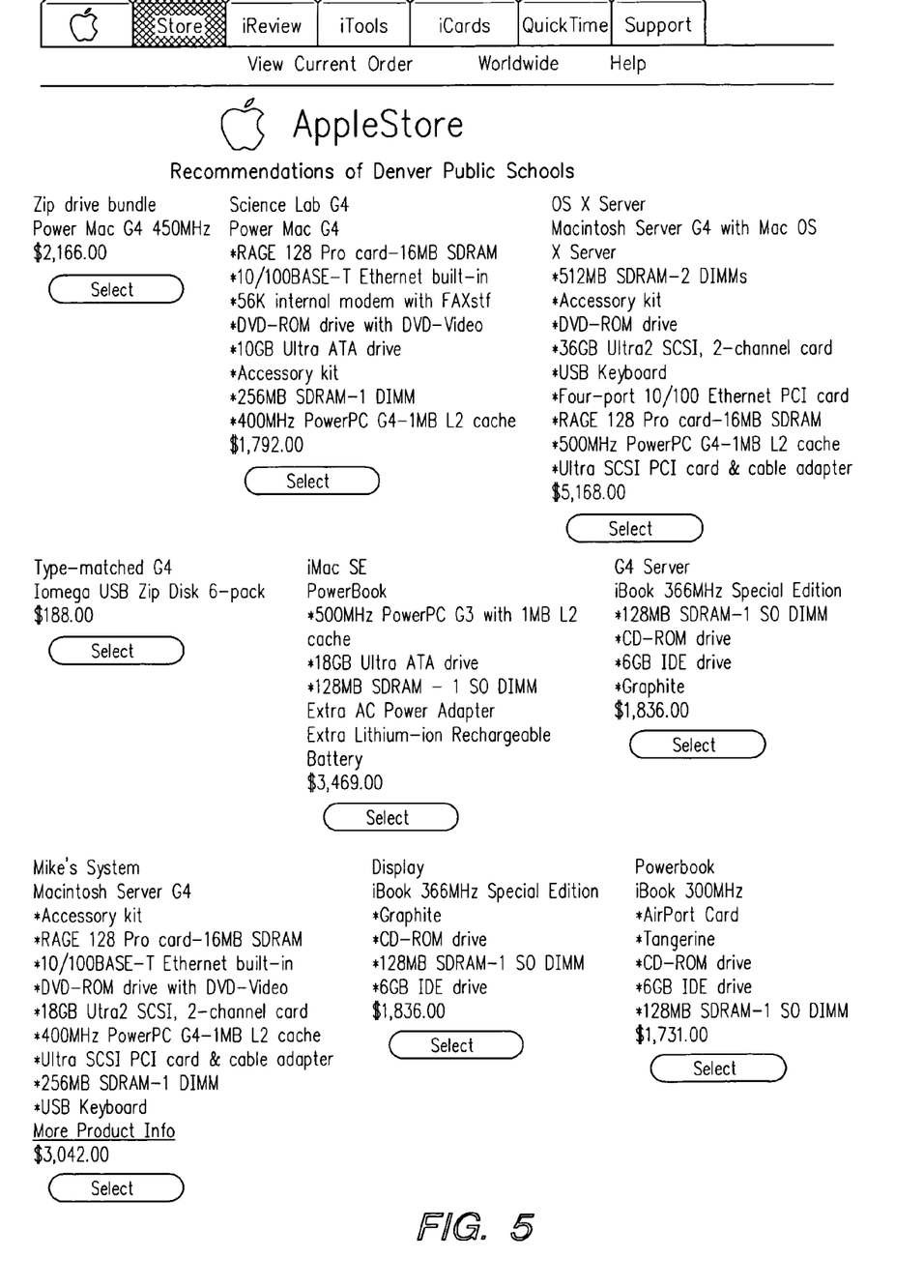

The user can click on a "Recommended System" button which sends the customer to a "Recommended System" page, such as the page shown in FIG. 5. This page illustrates the virtual bundles selected by the external administrator. Note that the title provided by the administrator is used. In one embodiment, an image can be shown for the main product of the bundle.

The user uses the "Recommended System" page to select a virtual bundle for purchase. Note that the virtual bundles described with respect to a preferred embodiment are computer systems, but the virtual bundles can be any group of elements selected by an external administrator.

The use of the external administrator to select the virtual bundles allows the virtual bundles to be selected specifically for a specific group. In FIG. 5, note that one virtual bundle is a computer configured for use by music school students. Another bundle is configured for law school students. The external administrator will have a good understanding of the needs of the group members.

Figure 6A:
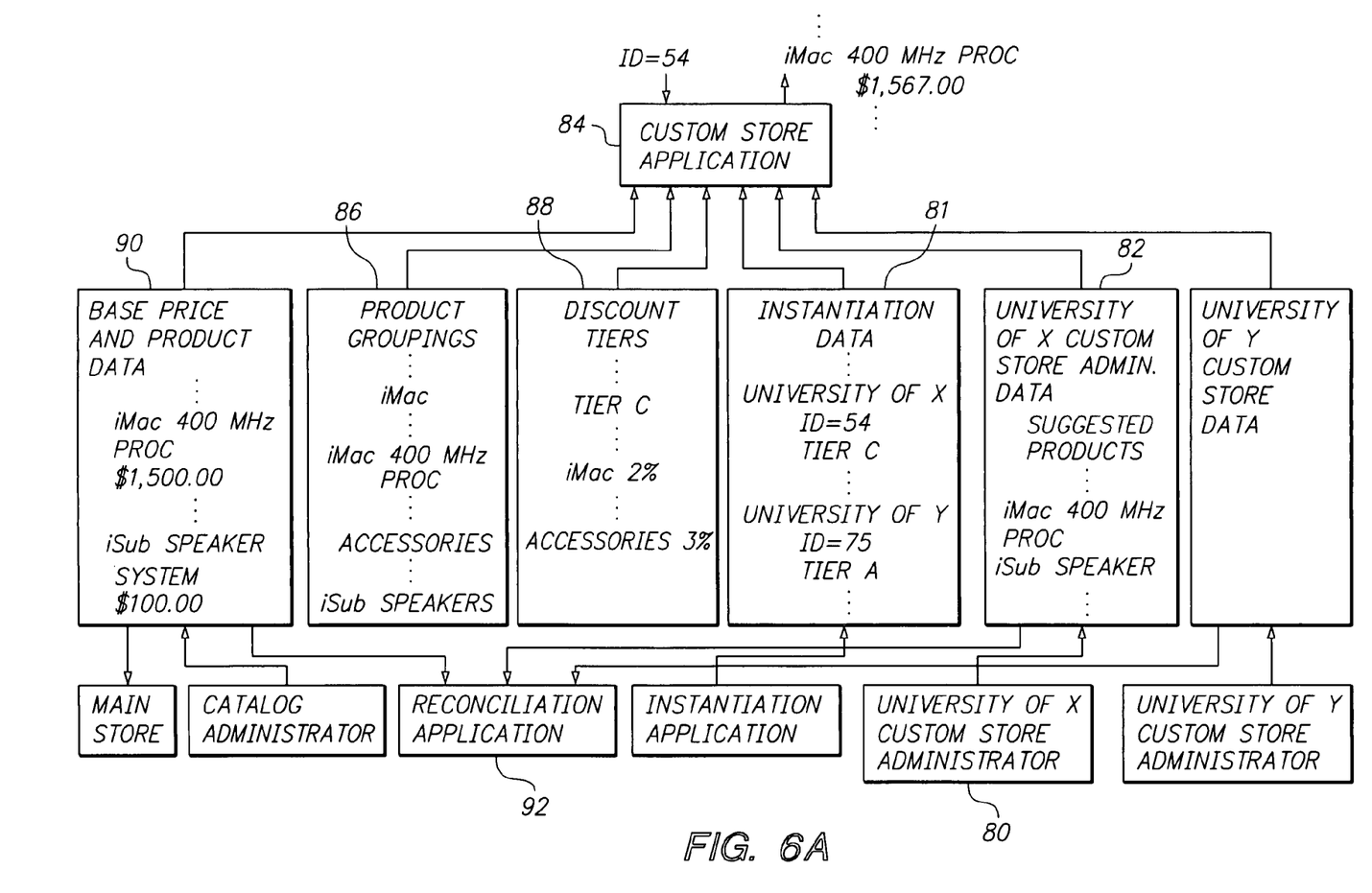
FIGS. 6A and 6B are diagrams that illustrate the dynamic construction of the price of the virtual bundles offered for sale at a custom store application.

FIG. 6A is a diagram that illustrates the operation and construction of the custom store web page using a virtual bundle. In FIG. 6A, a University of X custom store administrator 80 selects a virtual bundle. In this example, the simplified virtual bundle is an iMac 400 MHZ processor with an iSub speaker system. This data is stored in the University of X custom store administration data 82 in the database. When the member of the group sends in a custom store I.D. as part of the URL for the custom store, the custom store application 84 checks the instantiation data 81 and determines that the I.D. "54" refers to the University of X custom store. The University of X custom store data 82 includes a virtual bundle of the iMac 400 MHZ processor with an iSub speaker system. The custom store application 84 then determines from the products grouping list 86 the iMac and accessory discount information 88 for Tier C, the tier for the University of X. For the discount tier C, iMacs have a 2% discount, while accessories have a 3% discount. These discounts are applied to the base price data 90 so that the custom store application 84 can then calculate the discounted price to be provided at the custom store. In this way, whenever the base price data 90 is changed, the discounted price will also be changed for the members going to the custom store. The price of the virtual bundle is not fixed but changes as the base price data 90 changes. The reconciliation application 92 checks the virtual bundle data in the custom store administration data 82. If a product is obsolete, an e-mail notification is created and sent to the administrator to modify the custom store.

Figure 6B:
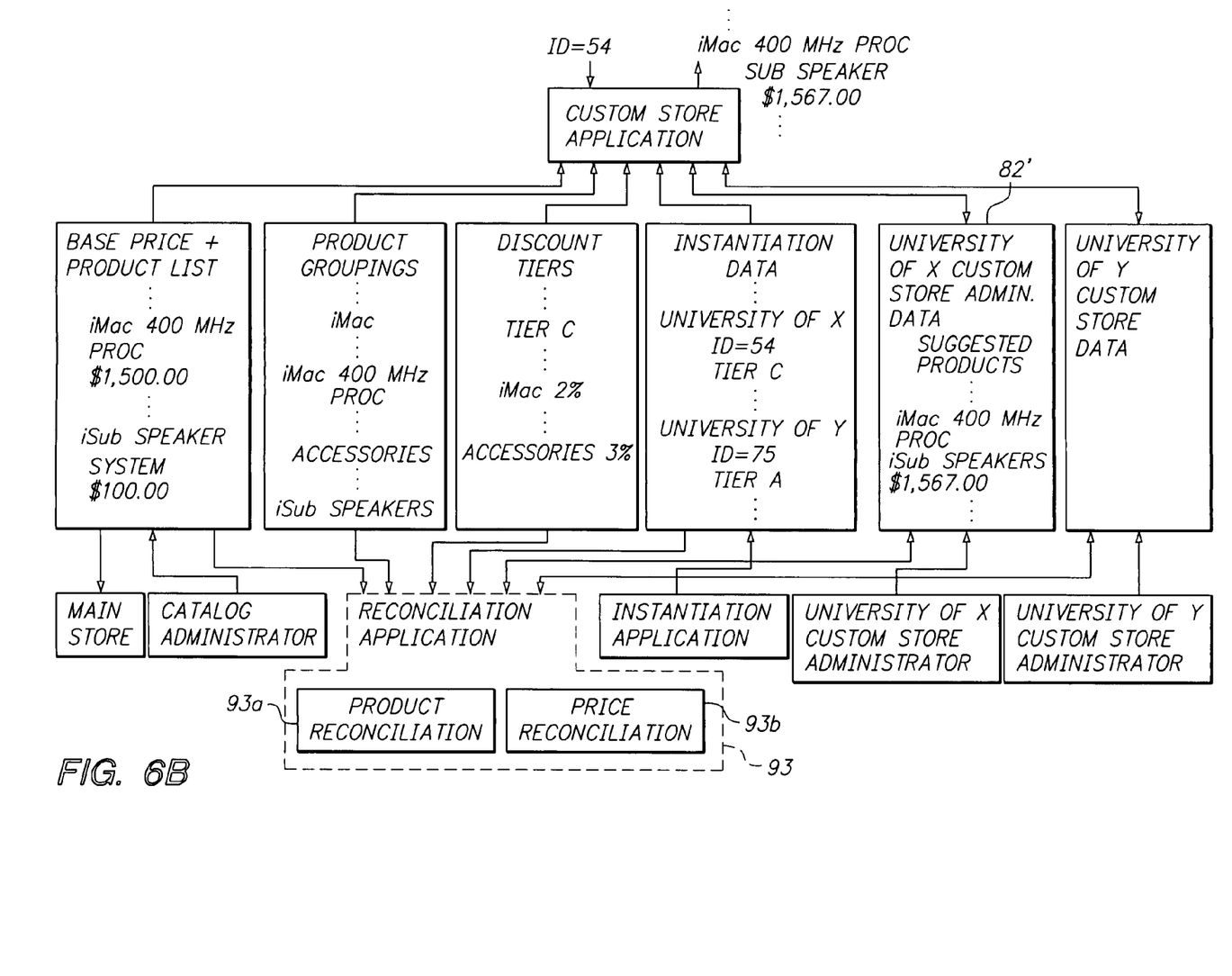

FIG. 6B illustrates an alternate embodiment of the present invention. In this alternate embodiment, the reconciliation application 93 includes a product reconciliation module 93a and a price reconciliation module 93b. The system calculates the discount prices for the recommended systems and stores them in the customs store data 82'. Periodically, the price reconciliation module 93b recalculates the discount prices of the recommended systems and stores the recalculated values in the custom store data 82'. Since the discounted prices are stored with the other custom store data, the custom store web site can quickly be displayed to users.

Figure 7:
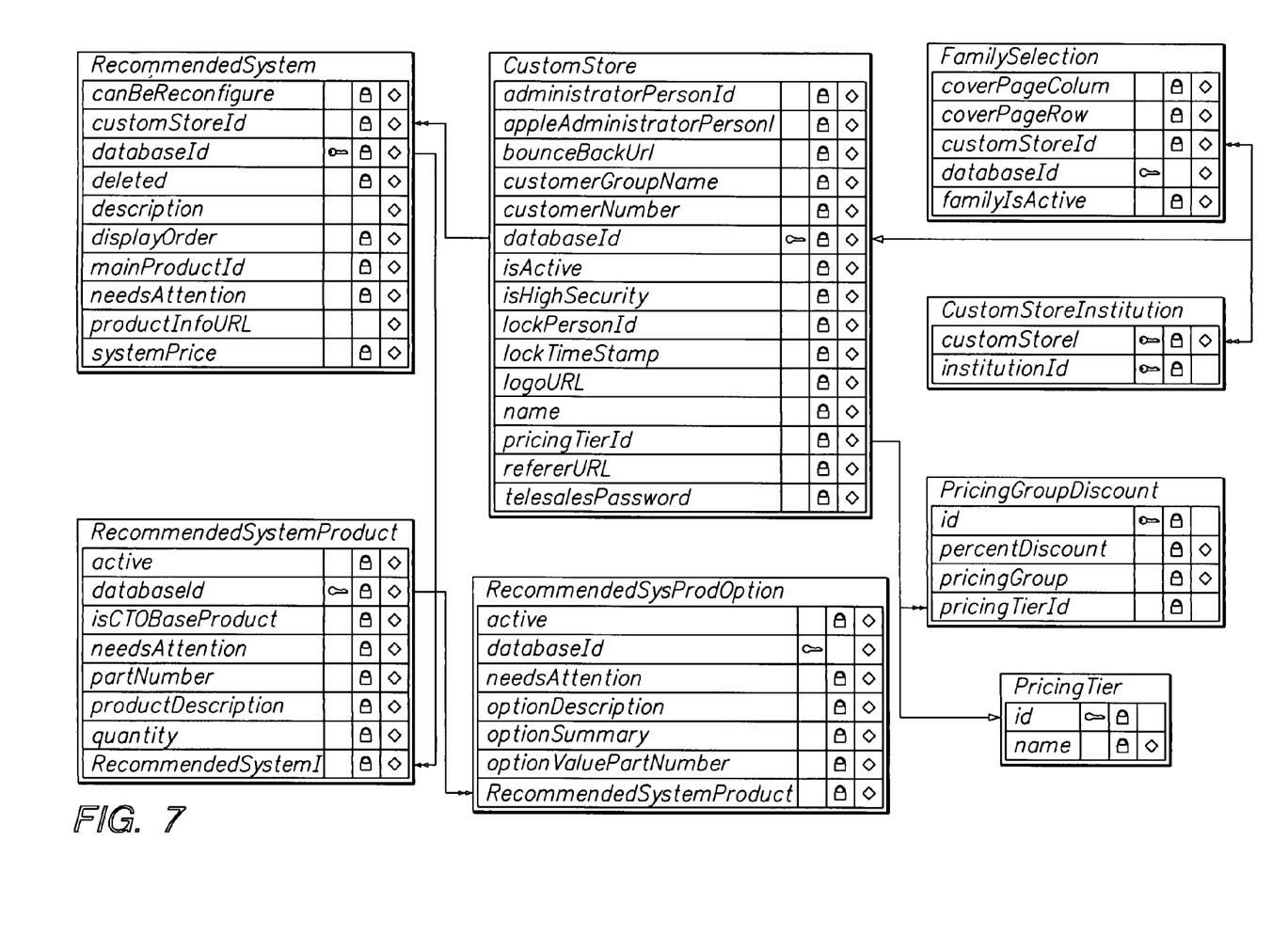
FIG. 7 is a diagram that illustrates the data structure for one embodiment of the present invention.

FIG. 7 is a diagram illustrating a data structure for one embodiment of the present invention. Each custom store has a number of associated recommended systems (virtual bundles of products). The fields shown include custom store customer number, database I.D., deleted product field, description, display order, and main product I.D. The main product I.D. indicates the image shown in the recommended system page. A "Needs Attention" flag can be used to indicate an obsolete product in the bundle. Each of the recommended systems products in the bundle references the products and additional options, each with specific fields.

Figure 8:
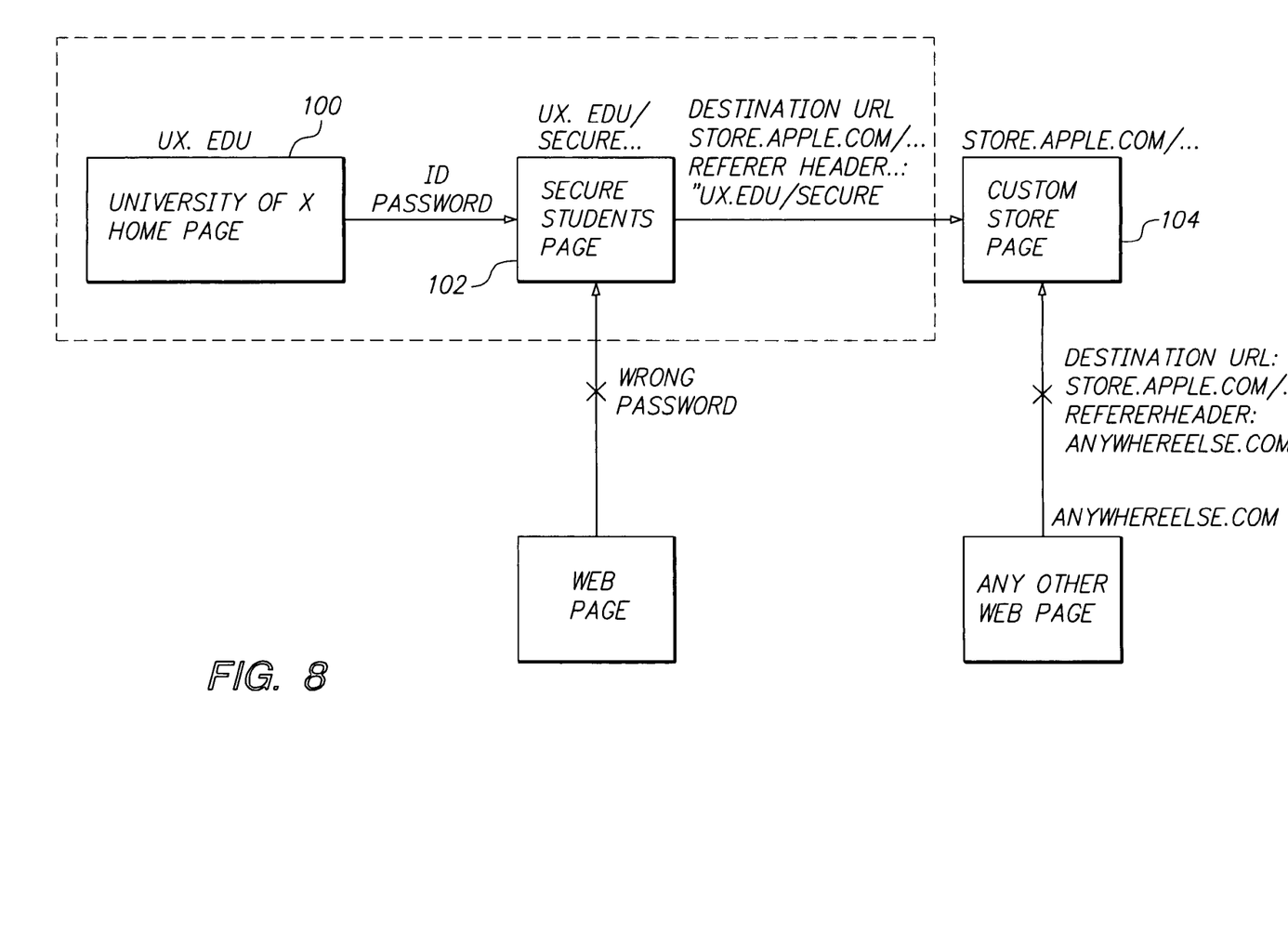
FIG. 8 is a diagram that illustrates a security system for one embodiment of the custom store system used with the present invention.

FIG. 8 is a diagram that illustrates the operation of the security systems used with the customs stores in one embodiment. In this system, the customer goes to a home page 100 and inputs the I.D. and password which the allows the student to go to a secured student page 102. From the secured student page, the customer clicks on to the custom store page URL and the custom store page 104 will be displayed. The custom store application only needs to check the referer header fields and need not keep track of group member I.D.s and group member passwords.

The foregoing has described the principles, preferred embodiments and modes of operation of the present invention. However, the invention should not be construed as limited to the particular embodiments discussed. Instead, the above described embodiments should be regarded as illustrative rather than restrictive, and it should be appreciated that variations may be made in the embodiments by workers skilled in the art without departing from the scope of the present invention as defined by the following claims.

The invention claimed is:

1. A system for presenting customized bundled products to members of a group for purchase on a vendor's e-commerce site, comprising:
   a server application that is responsive to a request from an authorized user associated with said group to present a first interface that enables said user to define a plurality of virtual bundles, where each virtual bundle comprises a set of one or more products supplied by the vendor and selected by said user;
   a database that stores information pertaining to the products in each virtual bundle defined by said user; and
   a server application that is responsive to a request at said vendor's e-commerce site, which request identifies the requestor as a member of said group, to present a second interface that retrieves said information from said database, displays the virtual bundles of products defined by said authorized user and allows said requestor to select one or more of said predefined virtual bundles for purchase, without further configuration or option selecting, wherein said first interface enables the authorized user to indicate whether the products in a defined virtual bundle can be configured by a purchaser.

2. The system of claim 1, further including a server application that determines whether any of the selected products of a virtual bundle are obsolete or upgradeable, and provides a notification to said authorized user if such a product is detected.

3. The system of claim 1 wherein said first interface enables the authorized user to indicate the order in which the defined virtual bundles of products are displayed in said second interface.

4. The system of claim 1 wherein said stored information includes an identification of a main product in a virtual bundle whose image is displayed on said second interface.

5. The system of claim 1, wherein the requestor is identified as being a member of said group by means of information indicating that the request is coming from a secure resource associated with the group.

6. The system of claim 1, wherein said database stores base prices for the products supplied by the vendor and a pricing tier for the group, and wherein the information stored for each virtual bundle includes a group price computed from said base price and pricing tier.

7. The system of claim 6, further including a server application that recalculates said group price and updates said stored information for the virtual bundles.

8. A method for presenting customized bundled products to members of a group for purchase on a vendor's e-commerce site, comprising the following steps:
   in response to a request from an authorized user associated with said group, presenting an interface that enables said user to define a plurality of virtual bundles, where each virtual bundle comprises a set of one or more products supplied by the vendor and selected by said user;
   storing information pertaining to the products in each virtual bundle defined by said user; and
   in response to a request at said vendor's e-commerce site which identifies the requestor as a member of said group, retrieving said stored information, displaying the virtual bundles of products defined by said authorized user and allowing said requester to select one or more of said predefined virtual bundles for purchase, without further configuration or option selecting, wherein said interface enables the authorized user to indicate whether the products in a defined virtual bundle can be configured by a purchaser.

9. The method of claim 8, further including the steps of determining whether any of the selected products of a virtual bundle are obsolete or upgradeable, and providing a notification to said authorized user if such a product is detected.

10. The method of claim 8 wherein said interface enables the authorized user to indicate the order in which the defined virtual bundles of products are displayed to members of the group.

11. The method of claim 8 wherein said stored information includes an identification of a main product in a virtual bundle whose image is displayed to members of the group.

12. The method of claim 8, wherein the requestor is identified as being a member of said group by means of information indicating that the request is coming from a secure resource associated with the group.

13. The method of claim 8, further including the steps of storing prices for the products supplied by the vendor and a pricing tier for the group, computing group prices from said base prices and pricing tier, and storing the computed group prices in association with the respective virtual bundles to which they apply.

14. The system of claim 13, further including the steps of recalculating said group price and updating said stored information for the virtual bundles.

15. A computer-readable medium containing a program that executes the following steps:
    presenting an interface that enables an authorized user associated with said group to define a plurality of virtual bundles, where each virtual bundle comprises a set of one or more products supplied by the vendor and selected by said user;
    storing information pertaining to the products in each virtual bundle defined by said user; and
    retrieving said stored information in response to a request at said vendor's e-commerce site which identifies the requester as a member of said group, displaying the virtual bundles of products defined by said authorized user, and allowing said requestor to select one or more of said predefined virtual bundles for purchase, without further configuration or option selecting, wherein said interface enables the authorized user to indicate whether the products in a defined virtual bundle can be configured by a purchaser.

16. The computer-readable medium of claim 15, wherein said program executes the further steps of determining whether any of the selected products of a virtual bundle are obsolete or upgradeable, and providing a notification to said authorized user if such a product is detected.

17. The computer-readable medium of claim 15 wherein said interface enables the authorized user to indicate the order in which the defined virtual bundles of products are displayed to members of the group.

18. The computer-readable medium of claim 15 wherein said stored information includes an identification of a main product in a virtual bundle whose image is displayed to members of the group.

19. The computer-readable medium of claim 15, wherein the requestor is identified as being a member of said group by means of information indicating that the request is coming from a secure resource associated with the group.

20. The computer-readable medium of claim 15, wherein said program executes the further steps of storing prices for the products supplied by the vendor and a pricing tier for the group, computing group prices from said base prices and pricing tier, and storing the computed group prices in association with the respective virtual bundles to which they apply.

21. The system of claim 20, wherein said program executes the further steps of recalculating said group price and updating said stored information for the virtual bundles.

\* \* \* \* \*